United States Patent
Qin et al.

(10) Patent No.: US 12,086,556 B2
(45) Date of Patent: Sep. 10, 2024

(54) METHOD, APPARATUS, DEVICE AND MEDIUM FOR GENERATING RECRUITMENT POSITION DESCRIPTION TEXT

(71) Applicant: Baidu Online Network Technology (Beijing) Co., Ltd., Beijing (CN)

(72) Inventors: Chuan Qin, Beijing (CN); Kaichun Yao, Beijing (CN); Hengshu Zhu, Beijing (CN); Chao Ma, Beijing (CN); Dazhong Shen, Beijing (CN); Tong Xu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 642 days.

(21) Appl. No.: 17/214,080

(22) Filed: Mar. 26, 2021

(65) Prior Publication Data

US 2021/0216726 A1  Jul. 15, 2021

(30) Foreign Application Priority Data

May 8, 2020  (CN) .......................... 202010381686.9

(51) Int. Cl.
*G06F 17/00* (2019.01)
*G06F 40/279* (2020.01)
*G06F 40/30* (2020.01)
*G06F 40/40* (2020.01)
*G06N 3/08* (2023.01)
*G06Q 10/0631* (2023.01)

(52) U.S. Cl.
CPC ............ *G06F 40/40* (2020.01); *G06F 40/279* (2020.01); *G06F 40/30* (2020.01); *G06N 3/08* (2013.01); *G06Q 10/063112* (2013.01)

(58) Field of Classification Search
None
See application file for complete search history.

(56) References Cited

U.S. PATENT DOCUMENTS

| | | | | |
|---|---|---|---|---|
| 10,909,442 B1 * | 2/2021 | Szarvas | ................... | G06N 3/08 |
| 11,113,732 B2 * | 9/2021 | Obasanjo | ........... | G06Q 30/0277 |
| 11,373,146 B1 * | 6/2022 | Yerastov | ............ | G06Q 10/1053 |
| 2012/0290518 A1 | 11/2012 | Flinn et al. | | |

(Continued)

FOREIGN PATENT DOCUMENTS

| | | |
|---|---|---|
| CN | 107967592 A | 4/2018 |
| CN | 109886641 A | 6/2019 |

(Continued)

OTHER PUBLICATIONS

Extended European Search Report dated Sep. 20, 2021 issued in EP Application No. 21165688.9.

(Continued)

*Primary Examiner* — Satwant K Singh
(74) *Attorney, Agent, or Firm* — Weaver Austin Villeneuve & Sampson LLP

(57) ABSTRACT

A method, an apparatus, a device and a medium for generating a recruitment position description text are provided. The method may include: obtaining the original text related to the target position; and generating a target recruitment position description text corresponding to the target position based on the original text and a pre-trained deep neural network model.

16 Claims, 7 Drawing Sheets

Obtaining an original text related to a target position — S110

Generating a target recruitment position description text corresponding to the target position based on the original text and the pre-trained deep neural network model — S120

(56) References Cited

U.S. PATENT DOCUMENTS

| | | | |
|---|---|---|---|
| 2018/0329883 A1* | 11/2018 | Leidner | G06F 40/30 |
| 2018/0365229 A1* | 12/2018 | Buhrmann | G06N 5/022 |
| 2018/0365231 A1 | 12/2018 | Li et al. | |
| 2019/0065470 A1 | 2/2019 | Matthews et al. | |
| 2019/0102704 A1 | 4/2019 | Liu | |
| 2019/0220749 A1* | 7/2019 | Feng | G06N 3/088 |
| 2019/0236148 A1 | 8/2019 | DeFelice | |
| 2019/0287012 A1 | 9/2019 | Celikyilmaz et al. | |
| 2019/0370336 A1 | 12/2019 | Prakash et al. | |
| 2020/0193382 A1* | 6/2020 | Michaels | G06F 40/289 |
| 2020/0210491 A1* | 7/2020 | Hajic | G06F 40/211 |
| 2023/0004941 A1* | 1/2023 | Yerastov | G06F 40/20 |

FOREIGN PATENT DOCUMENTS

| | | |
|---|---|---|
| CN | 109918483 A | 6/2019 |
| CN | 110032681 A | 7/2019 |
| CN | 110782072 A | 2/2020 |
| JP | 2005346171 A | 12/2005 |
| JP | 2020506466 A | 2/2020 |
| KR | 20160117516 A | 10/2016 |
| KR | 20180025691 A | 3/2018 |

OTHER PUBLICATIONS

Zhao Meng et al., "Skill: A System for Skill Identification and Normalization," Jan. 1, 2015 (Jan. 1, 2015), XP055818870, Retrieved from the Internet: URL:https://www.aaai.org/ocs/index.php/IAAI/IAAI15/paper/viewFile/9363/9907 [retrieved on Jun. 28, 2021].

* cited by examiner

METHOD, APPARATUS, DEVICE AND MEDIUM FOR GENERATING RECRUITMENT POSITION DESCRIPTION TEXT

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to computer technologies, and more particularly, to the technical field of artificial intelligence, and more particularly, to a method, apparatus, device, and medium for generating a recruitment position description text.

BACKGROUND

A recruitment position description shows the responsibilities of a position and skill requirements, and an efficient position description will help the employer to find the right person for the position and provide the candidate with a clear understanding of the responsibilities and qualifications for the particular position.

In the related technology, to obtain a match between the recruitment position and the people to be recruited, it needs to analyze the recruitment market by the human resource experts, and write manually the description of the recruitment position, and thus the human subjectivity is strong, and a large amount of human cost is required. In addition, because human resources employees have domain gaps for the professional skills of different positions, there are always some deviations, resulting in a failure of accurate match between the recruitment position and the people to be recruited, thus the recruitment efficiency is low.

SUMMARY

Embodiments of the present disclosure provide a method, apparatus, device and medium for generating a recruitment position description text, to accurately describe a recruitment position and improve the efficiency of generating a position description.

According to a first aspect, there is provided a method of generating a recruitment position description text, including:
  obtaining the original text related to the target position;
  generating a target recruitment position description text corresponding to the target position based on the original text related to the target position and a pre-trained deep neural network model.

According to a second aspect, there is provided an apparatus for generating a recruitment position description text, including:
  an original text acquisition module, for acquiring an original text related to a target position;
  a description text generating module, for generating a target recruitment position description text corresponding to the target position based on the original text related to the target position and a pre-trained deep neural network model.

According to a third aspect, there is provided an electronic device including:
  at least one processor; and
  a memory in communication connection with the at least one processor; where,
  the memory stores instructions executable by the at least one processor, the instructions being executed by the at least one processor to enable the at least one processor to perform a method of generating a recruitment post description text described in any of the embodiments of the present disclosure.

According to a fourth aspect, there is provided a non-transitory computer-readable storage medium having stored thereon computer instructions for causing the computer to perform a method of generating a recruitment post description text as described in any of the embodiments of the present disclosure.

It is to be understood that the description in this section does not intend to identify key or critical features of the embodiments of the disclosure, nor does it intend to limit the scope of the disclosure. Other features of the present disclosure will become readily apparent from the following description.

BRIEF DESCRIPTION OF THE DRAWINGS

The drawings are intended to provide a better understanding of the present disclosure and are not to be construed as limiting the application, where.

DETAILED DESCRIPTION OF EMBODIMENTS

Exemplary embodiments of the present disclosure are described below in connection with the accompanying drawings, in which various details of the embodiments of the present disclosure are included to facilitate understanding, and are to be considered as exemplary only. Accordingly, one of ordinary skill in the art will recognize that various changes and modifications may be made to the embodiments described herein without departing from the scope and spirit of the present disclosure. Also, for clarity and conciseness, descriptions of well-known functions and structures are omitted from the following description.

Figure 1:
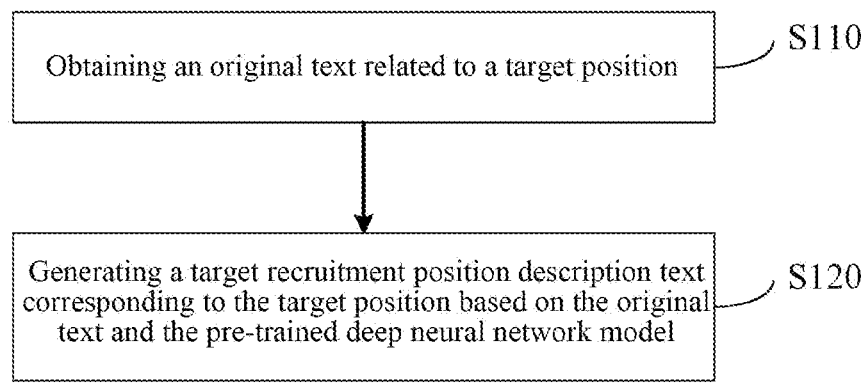
FIG. 1 is an illustrative flowchart of a method for generating a recruitment position description text according to an embodiment of the present disclosure.

FIG. 1 is an illustrative flow chart of a method for generating a recruitment position description text according to an embodiment of the present disclosure, which is used for automatically generating a recruitment position description text. The method may be performed by a device for generating a recruitment position description text, which may be implemented in software and/or hardware, and may be integrated into an electronic device with computing-capability. As shown in FIG. 1, a method for generating the recruitment position description text according to the present embodiment may include following steps.

S110 includes obtaining an original text related to a target position.

The original text related to the target position collected in advance by the staff is obtained.

In the present embodiment, optionally, the original text includes at least one of a resume text of a person who has been determined to meet the position requirement, a text containing position responsibility data, and a text containing project data related to the position.

Specifically, the resume text of the person who has determined to meet the position requirements may include the resume text of a person who has already enrolled and the resume text of a person who has passed the review and to be enrolled. A staff collects the resume text of an enrolled person and the resume text of a person who has passed a review and is about to be enrolled in advance, and collects responsibility data of different positions as text containing position responsibility data, and collects project or engineering data related to different positions as the text containing project data related to position. For example, the contents written in the resume of an employee may be that: a professional research direction for an employee is an intelligent robot, and the content written in the text containing the project data related to position may be that: a target position project refers to an intelligent robot obstacle avoidance project. By obtaining the original text, valid information related to the duty and skill requirements of the target position may be extracted, which facilitates an accurate matching of the generated target recruitment position description text with the duty and skill requirements of the target position.

S120 includes generating a target recruitment position description text corresponding to the target position based on the original text and a pre-trained deep neural network model.

The deep neural network model is a model pre-trained to generate target recruitment position description text. The target recruitment position description text includes description of duties and skills of the target position and the like, which shall be presented to the position seeker. The original text related to the target position is input to the pre-trained deep neural network model, and the related data of the target position is extracted from the original text related to the target position by the deep neural network model. For example, data such as a current position of an enrolled person, a research direction of an enrolled person, and a current project of an enrolled person may be extracted from the resume texts of an enrolled person, and data such as a position willingness of a to-be-enrolled person and a research direction of the to-be-enrolled person may be extracted from the resume texts of a person that has passed review and will be enrolled, and data such as a main responsibility, a work task, and a professional requirement of the position may be extracted from the text including position responsibility data, and data such as a historical project and a current project of the position may be extracted from a text including position data related to project.

After obtaining the original text related to the target position, the deep neural network model generates the target recruitment position description text corresponding to the target position based on the extracted data.

One embodiment of the above-mentioned application has the advantage or beneficial effect that the target recruitment position description text may be automatically and quickly generated through the deep neural network, and the generated target recruitment position description text may be matched with the needs of the target position, thereby improving the generation efficiency and accuracy of the recruitment position description text, and further reducing the human resource and time of the recruitment process and improving the recruitment efficiency.

Figure 2:
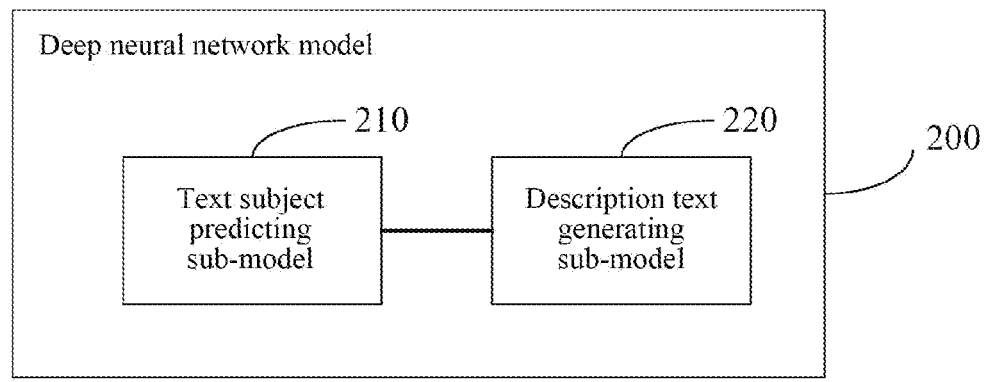
FIG. 2 is an illustrative structural diagram of a deep neural network model according to an embodiment of the present disclosure.

FIG. 2 is an illustrative structural diagram of a deep neural network model according to an embodiment of the present disclosure, which may execute the method as discussed in the above. As shown in FIG. 2, the present embodiment provides a deep neural network model 200 that may include:
  a text subject predicting sub-model 210 for predicting a target skill subject distribution vector based on the original text related to the target position; and
  a description text generating sub-model 220 for generating the target recruitment position description text of the target position according to the target skill subject distribution vector.

The target skill subject distribution vector is a skill subject distribution vector of the target position, and the skill subject refers to a category name of a job skill required by the position. For example, the skill subject may include a coding type of skill subject, a machine learning type of skill subject, a big data type of skill subject, and the like.

The text subject predicting sub-model 210 obtains the original text related to the target position, and extracts the skill subject data of the target position from the original text related to the target position. For example, the project name of the enrolled person at the target position may be extracted, and the skill subject of the project may be obtained based on the project name. The target skill subject distribution vector may be predicted based on the related data of the target position, thereby determining the skill subject of the target position.

After the text subject predicting sub-model 210 determines the target skill subject distribution vector, the target skill subject distribution vector is transmitted to the description text generating sub-model 220 by the text subject predicting sub-model 210, and the description text generating sub-model 220 generates the target recruitment position description text according to the target skill subject distribution vector, to facilitate text description for the target position. For example, if the target position is a software engineer, and the target skill subject distribution vector of the position is a coding type of skill subject, the target recruitment position description text finally generated may be "software engineer: Requires proficient use of JAVA and C++, and more than three years of working experience."

One embodiment of the above-mentioned application has the advantage or advantageous effect of dividing the deep neural network model into a text subject predicting sub-model and a description text generating sub-model, which reduces the manual operation steps and saves human resource and time, thus realizes separate steps of determining the skill subject and the description text of the target position. Accordingly, the description text is obtained according to the skill subject and thus improve the accuracy and efficiency of the target recruitment position description text.

Figure 3:
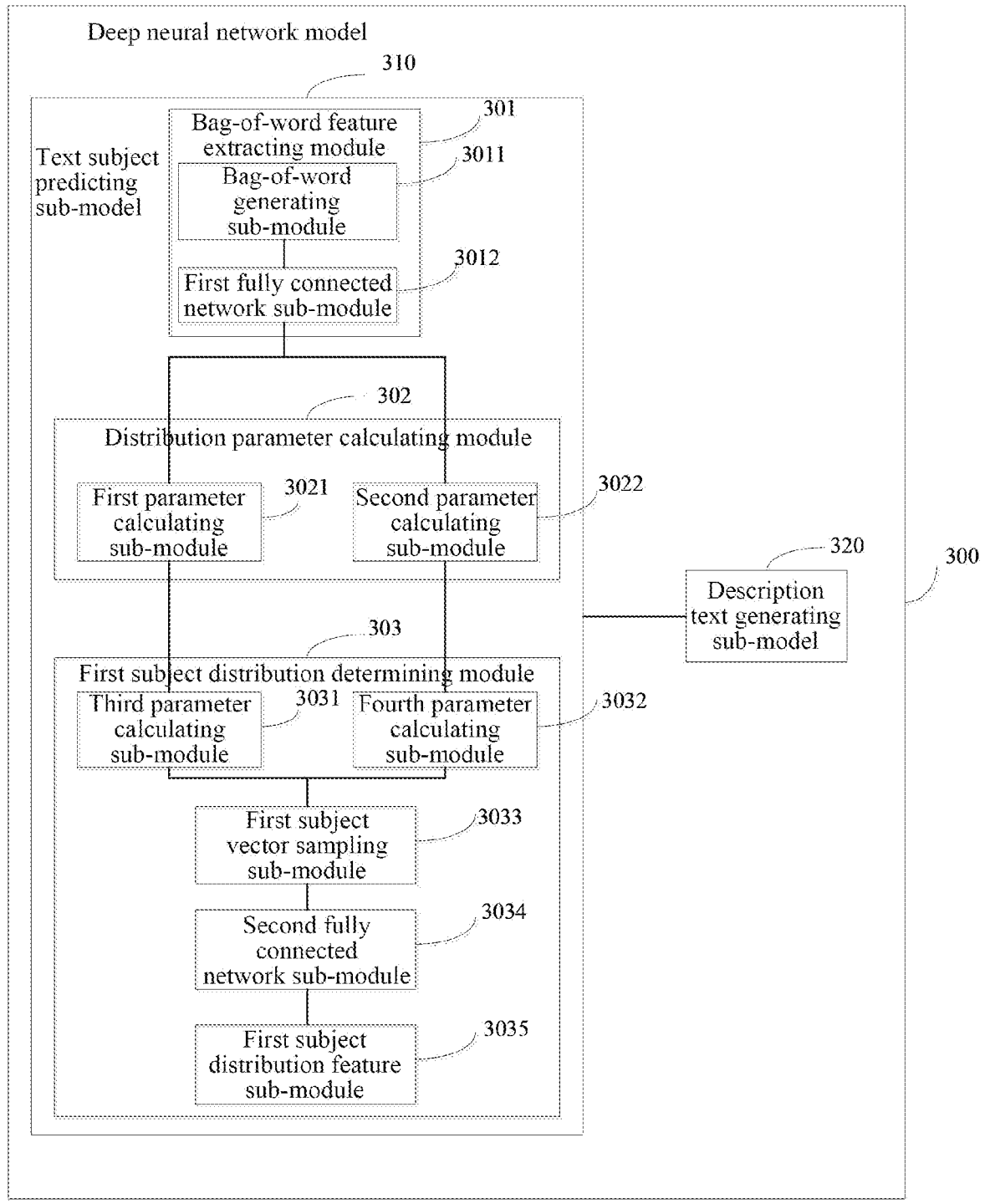
FIG. 3 is an illustrative structural diagram of a deep neural network model according to an embodiment of the present disclosure.

FIG. 3 is an illustrative structural diagram of a deep neural network model according to an embodiment of the present disclosure, which is further optimized on the basis of the above-described embodiment. As shown in FIG. 3, the deep neural network model 300 provided by the present embodiment may include: a text subject predicting sub-model 310 and a description text generating sub-model 320.

In the present embodiment, optionally, the text subject predicting sub-model 310 includes: a bag-of-word feature extraction module for extracting a bag-of-word feature vector of the original text related to the target position; a distribution parameter calculation module for calculating a skill subject vector distribution parameter according to bag-of-word feature vector and non-linear network layer; a first subject distribution determining module for obtaining a target skill subject distribution vector according to the skill subject vector distribution parameter and a pre-set subject distribution hypothesis parameter.

The bag-of-word feature extracting module 301 extracts a bag-of-word feature vector from the original text related to the target position, after obtaining the original text related to the target position. For example, the original text related to the target position is "software engineer needs programming basis" and "software engineer needs to be seriousness and down-to-earth,", and the bag-of-word feature vector may be expressed as [111100] and [110011].

The bag-of-word feature extracting module 301 sends the bag-of-word feature vector to the distribution parameter calculating module 302, and the distribution parameter calculating module 302 calculates the skill subject vector distribution parameter according to the bag-of-word feature vector and the pre-set non-linear network layer. The distribution parameter calculating module 302 sends the skill subject vector distribution parameter to the first subject distribution determining module 303, and the first subject distribution determining module 303 calculates the target skill subject distribution vector according to the skill subject vector distribution parameter and the pre-set subject distribution hypothesis parameter set in advance.

By dividing the text subject predicting sub-model 310 into three sub-modules, the well-organized calculation of the target skill subject distribution vector is realized, the calculation accuracy is improved, the manual operation is reduced, the process of manually determining the skill subject is avoided, and the calculation efficiency of the target skill subject distribution vector is improved.

In this embodiment, optionally, the bag-of-word feature extracting module includes a bag-of-word generating sub-module for generating bag-of-word characterization data of the original text related to the target position; a first fully connected network sub-module for performing feature extraction of the bag-of-word characterization data to obtain a bag-of-word feature vector.

Specifically, the bag-of-word feature extracting module 301 may include a bag-of-word generating sub-module 3011 and a first fully connected network sub-module 3012. The first fully connected network sub-module 3012 may include one or more layers of fully connected networks. After receiving the original text related to the target position, the deep neural network model is acquired by the bag-of-word generating submodule 3011 in the bag-of-word feature extracting module 301. The bag-of-word generating sub-module 3011 extracts the bag-of-word characterization data in the original text related to the target position, for example, the original text related to the target position is "software engineer needs programming basis" and "software engineer needs to be seriousness and down-to-earth", and the extracted bag-of-word characterization data is "software engineer, need, programing, basis, seriousness, down-to-earth," which is represented as $X_i^{bow}$. The bag-of-word generating sub-module 3011 sends the bag-of-word characterization data to the first fully connected network sub-module 3012, and the bag-of-word characterization data may be extracted by the first fully connected network sub-module 3012 for a plurality of times to generate a bag-of-word feature vector, where $f_{e_d}$ may represent the fully connected network in the first fully connected network sub-module 3012. The bag-of-word feature vector is generated by the bag-of-word generating sub-module 3011 and the first fully connected network sub-module 3012, so that the calculation accuracy of the bag-of-word feature vector is improved, the automatic extraction of the bag-of-word feature is realized, the manual operation is reduced, and the calculation efficiency of the target skill subject distribution vector is further improved.

In the present embodiment, optionally, the distribution parameter calculating module includes a first parameter calculating sub-module for calculating a first skill subject vector distribution sub-parameter according to the bag-of-word feature vector and the first non-linear network layer; a second parameter calculating sub-module for calculating a second skill subject vector distribution sub-parameter based on the bag-of-word feature vector and the second non-linear network layer.

Specifically, the distribution parameter calculating module 302 may include a first parameter calculating sub-module 3021 and a second parameter calculating sub-module 3022. The first parameter calculating sub-module 3021 receives the bag feature vector of the first fully connected network sub-module 3012, and calculates the first skill subject vector distribution sub-parameter based on the pre-set first non-linear network layer. The first non-linear network layer may be represented by $f_{\mu_d}$ and the first skill subject vector distribution sub-parameters may be represented by $\mu_d$. The calculation formula of the first skill subject vector distribution sub-parameter $\mu_d$ is as follows:

$$\mu_d = f_{\mu_d}(f_{e_d}(X_i^{bow}))$$

The second parameter calculating sub-module 3022 calculates the second skill subject vector distribution sub-parameter according to the pre-set second non-linear network layer, after receiving the bag-of-word feature vector of the first fully connected network sub-module 3012. The second non-linear network layer may be represented by $f_{\sigma_d}$, and the second skill subject vector distribution sub-parameters may be represented by $\sigma_d$. The calculation formula of the second skill subject vector distribution sub-parameter $\sigma_d$ is as follows:

$$\log \sigma_d = f_{\sigma_d}(f_{e_d}(X_i^{bow}))$$

The skill subject vector distribution parameters may include $\mu_d$ and $\sigma_d$, and by calculating the $\mu_d$ and $\sigma_d$, an accurate calculation of the skill subject vector distribution parameter is realized, thereby improving the calculation efficiency of the target skill subject distribution vector.

In the present embodiment, optionally, the first subject distribution determining module includes a third parameter calculation sub-module for calculating a third skill subject vector distribution parameter according to the first skill subject vector distribution sub-parameter and the first pre-set subject distribution hypothesis sub-parameter; a fourth parameter calculating sub-module for calculating a fourth skill subject vector distribution parameter according to the second skill subject vector distribution sub-parameter and the second pre-set subject distribution hypothesis sub-parameter; a first subject vector sampling sub-module for obtaining a first skill subject vector according to a third skill subject vector distribution parameter and a fourth skill subject vector distribution parameter; a second fully connected network sub-module for performing feature extraction on the first skill subject vector to obtain the first subject feature vector; a first subject distribution feature calculating sub-module for obtaining a target skill subject distribution vector based on the first subject feature vector and the first activation function.

Specifically, the first subject distribution determining module 303 may include a third parameter calculating sub-module 3031, a fourth parameter calculating sub-module 3032, a first subject vector sampling sub-module 3033, a second fully connected network sub-module 3034, and a first subject distribution feature sub-module 3035. The third parameter calculation sub-module 3031 receives the first skill subject vector distribution sub-parameter $\mu_d$ of the first parameter calculating sub-module 3021, and calculates the third skill subject vector distribution parameter according to the pre-defined first pre-set subject distribution hypothesis sub-parameter. The first pre-set subject distribution hypothesis sub-parameter may be represented by $W_\mu$, and the third skill subject vector distribution parameter may be represented by $\mu_s$, $\mu_s = W_\mu \mu_d$. The fourth parameter calculating sub-module 3032 receives the second skill subject vector distribution sub-parameter $\sigma_d$ of the second parameter calculating sub-module 3022, and calculates the fourth skill subject vector distribution parameter $\log \sigma_s = W_\sigma (\log \sigma_d)$, according to the pre-defined second pre-set subject distribution hypothesis sub-parameter. The second pre-set subject distribution hypothesis sub-parameter may be represented by $W_\sigma$, and the fourth skill subject vector distribution parameter may be represented by $\sigma_s$.

The first subject vector sampling sub-module 3033 receives the third skill subject vector distribution parameter $\mu_s$ of the third parameter calculating sub-module 3031 and the fourth skill subject vector distribution parameter $\sigma_s$ of the fourth parameter calculating sub-module 3032, and calculates the first skill subject vector, which may represent the first skill subject vector with $z^s$. The second fully connected network sub-module 3034 receives the first skill subject vector of the first subject vector sampling sub-module 3033, and performs feature extraction for the first skill subject vector to obtain the first subject feature vector. For example, for a corresponding target recruitment description, $S = \{s\_1, s\_2, \ldots, s\_l\}$ where $s\_l$ is each recruitment description statement and the subject vector may be obtained by sampling $z^s \sim N(\mu_s, \sigma_s^2)$. The second fully connected network sub-module 3034 may include one or more layers of fully connected networks, where the fully connected networks in the second fully connected network sub-module 3034 may be represented by $f_{\theta^s}$.

The first subject distribution feature calculating sub-module 3035 receives the first subject feature vector of the second fully connected network sub-module 3034, and obtains the target skill subject distribution vector according to the pre-set first activation function. The first activation function may be represented by $\text{softmax}(f_{\theta^s})$, and the target skill subject distribution vector may be represented by $\theta^s$, where $\theta^s = \text{softmax}(f_{\theta^s}(z^s))$. By performing separate steps of calculation of the target skill subject distribution vector, calculation efficiency is improved, calculation accuracy of the target skill subject distribution vector is ensured, and automation of text subject prediction is realized.

One embodiment of the above application has the advantage or advantage of automatically generating a target skill subject distribution vector by dividing the text subject prediction sub-model into a bag-of-word feature extracting module, a distribution parameter calculating module, and a first subject distribution determining module. The problem of manually extraction of position information by human resource employees in the prior art is solved, the subjectivity of human is reduced, generation time and cost of recruitment position description text are saved, errors caused by the fact that human resource employees have field gaps for professional skills of different positions are avoided, accurate matching of recruitment positions with recruitment personnel is facilitated, and recruitment efficiency is improved.

Figure 4:
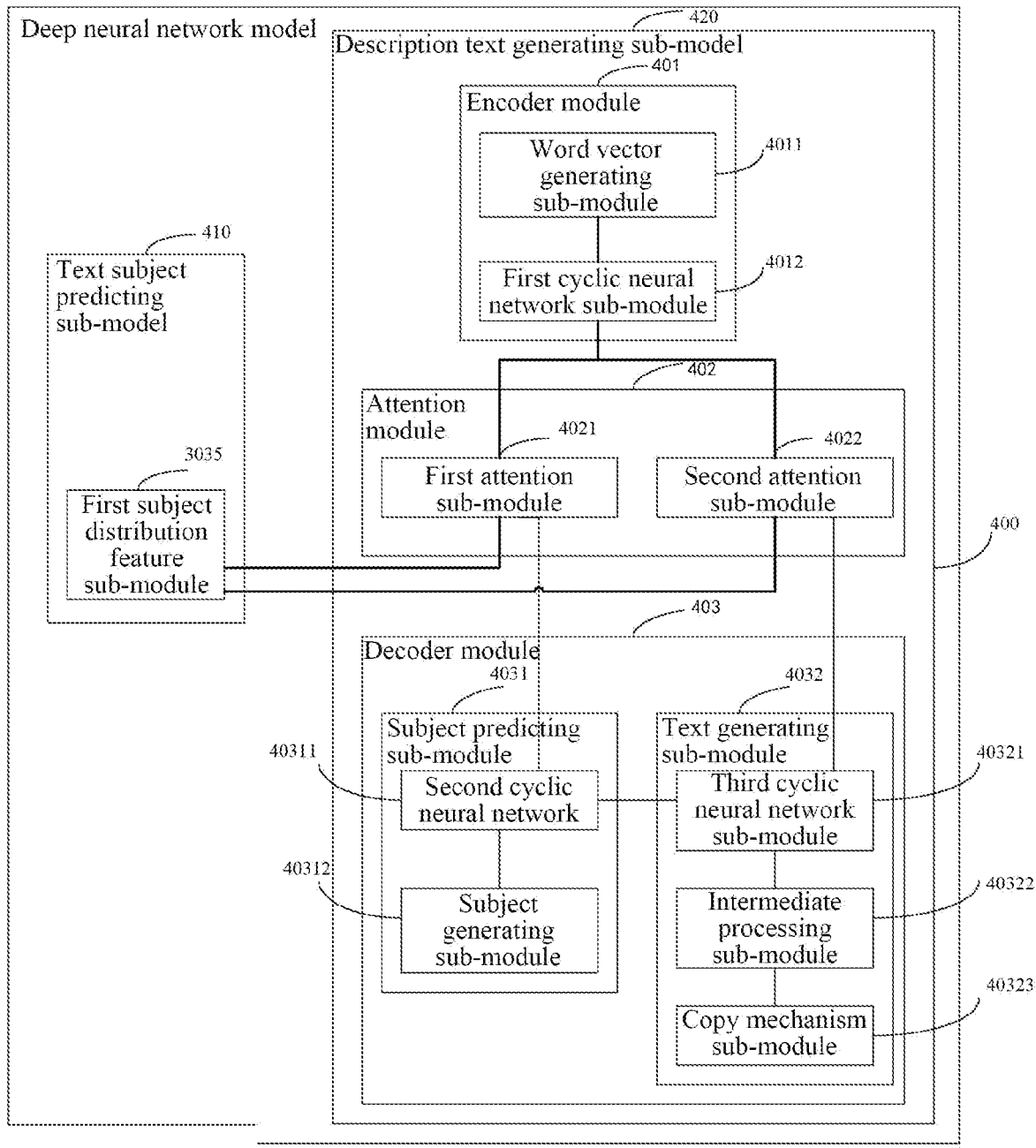
FIG. 4 is an illustrative structural diagram of a deep neural network model according to an embodiment of the present disclosure.

FIG. 4 is an illustrative structural diagram of a deep neural network model according to an embodiment of the present disclosure, which is further optimized on the basis of the above-described embodiment. As shown in FIG. 4, the deep neural network model 400 provided by the present embodiment may include: a text subject predicting sub-model 410 and description text generating sub-model 420.

In the present embodiment, optionally, the description text generating sub-model includes an encoder module for generating a sequence of semantic characterization vectors of the current sentence in the original text related to the target position; an attention module for performing weighted transformation on the sequence of the semantic characterization vectors according to the target skill subject distribution vector; a decoder module for predicting a skill subject label of a current sentence according to the weighted and transformed sequence of semantic characterization vectors; and predicting the current word of the target recruitment position description text according to the skill subject label.

Specifically, the description text generating sub-model 420 may include an encoder module 401, an attention module 402, and a decoder module 403. The encoder module 401 generates a sequence of semantic characterization vectors of the current sentence in the original text related to the target position, the sequence of semantic characterization vectors may be represented by H, and a bidirectional cyclic neural network may be used for the input sequence $X = \{x\_1, x\_2, \ldots, x\_M\}$ to obtain a sequence of semantic characterizations $H = \{h_1^d, h_2^d, \ldots, h_M^d\}$, where $h_M^d$ represents the vector of semantic characterizations of any word in the input sequence, and $M^d$ represents the number of words. The attention module 402 acquires the target skill subject distribution vector $\theta^s$ of the first subject distribution characteristic calculating sub-module 3035, and performs weighted transformation on the semantic characterization sequence H according to the target skill subject distribution vector $\theta^s$. The decoder module 403 receives the weighted and transformed sequence of semantic characterization vectors, and may use two one-way circular neural networks to model the prediction of the skill subject label of the current sentence, and further obtain the prediction of the current word of the target recruitment position description text according to the skill subject label. The skill subject label may be represented by $t_j$, and the current word of the target recruitment post description text may be represented by $s_{j,k}$. By dividing the description text generating sub-model 420 into modules, the skill subject label of the target recruitment position and the current word of the description text may be automatically predicted, so that manual operation is reduced, and efficiency in forming the recruitment statement is improved.

In the present embodiment, optionally, the encoder module includes a word vector generating sub-module for generating a word vector of each word included in the current sentence of the original text related to the target position; a first cyclic neural network sub-module for generating a sequence of semantic characterization vectors of the current sentence according to each word vector.

Specifically, the encoder module 401 may include a word vector generating sub-module 4011 and a first cyclic neural network sub-module 4012, and the word vector generating sub-module 4011 may generate a word vector of each word included in the current sentence based on the original text related to the target position, which may be represented by $e_k^d$. The first cyclic neural network sub-module 4012 receives the word vector $e_k^d$ of the word vector generating sub-module 4011, and generates a sequence of semantic characterization vectors H of the current sentence. Accurate calculation of the semantic characterization vector sequence is realized, human resource and time are saved, and generation efficiency of target recruitment position description text is improved.

In the present embodiment, optionally, the attention module includes a first attention sub-module and a second attention sub-module. The decoder module includes a subject predicting sub-module and a text generating submodule. The first attention sub-module is configured to perform weighted transformation on the semantic characterization vector sequence according to the target skill subject distribution vector and the hidden layer feature state vector in the subject prediction sub-module to obtain the weighted and transformed first vector sequence. The second attention sub-module is configured to perform weighted transformation on the semantic characterization vector sequence according to the target skill subject distribution vector and the hidden layer feature state vector in the text generation sub-module to obtain a weighted and transformed second vector sequence. The subject predicting sub-module is configured for predicting a skill subject label of the current sentence based on a target skill subject distribution vector and the first vector sequence. The text generating sub-module is configured for predicting a current word in the target recruitment position description text based on the skill subject label of the current sentence and the second vector sequence.

Specifically, the attention module 402 may include a first attention sub-module 4021 and a second attention sub-module 4022, and the decoder module 403 may include a subject predicting sub-module 4031 and a text generating sub-module 4032. The first attention sub-module 4021 acquires the target skill subject distribution vector $\theta^s$ of the first subject distribution feature sub-module 3035, and performs weighted transformation on the semantic characterization vector sequence H according to the hidden layer feature state vector in the subject predicting sub-module 4031 to obtain the weighted and transformed first vector sequence. The hidden layer feature state vector in the subject predicting sub-module 4031 may be represented by $h_j^t$, and the first vector sequence may be represented by $u_j^t$. The second attention sub-module 4022 acquires the target skill subject distribution vector $\theta^s$ of the first subject distribution feature sub-module 3035, and performs weighted transformation on the semantic characterization vector sequence H according to the hidden layer feature state vector in the text generating sub-module 4032 to obtain the weighted and transformed second vector sequence. The hidden layer feature state vector in the text generating sub-module 4032 may be represented by $h_{j,k}^c$, and the second vector sequence may be represented by $u_{j,k}^c$.

The subject predicting sub-module 4031 predicts the skill subject label $t_j$ of the current sentence based on the target skill subject distribution vector $\theta^s$ and the first vector sequence $u_j^t$. The text generating sub-module 4032 obtains the skill subject label $t_j$ and the second vector sequence $u_{j,k}^c$ of the current sentence output by the subject predicting sub-module 4031, and predicts the current word $s_{j,k}$ in the target recruitment position description text. For example, the prediction of the current word of the skill subject label and the target recruitment position description text may be performed using the following formula:

$$p(t_j \mid t_{<j}, H, \theta^s) = \text{soft max}\left(W_t\left[h_j^t; u_j^t; \theta^s\right] + b_t\right)$$

$$p(y_{j,k} \mid y_{<j}, y_{j,<k}, H, \theta^s, t_j) = \text{soft max}\left(W_c\left[h_{j,k}^c; u_{j,k}^c; \theta^s\right] + b_c\right)$$

Where, $p(t_j|t_{<j}, H, \theta^s)$ represents the prediction probability of the skill subject label, $p(y_{j,k}|y_{<j}, y_{j,<k}, H, \theta^s, t_j)$ represents the prediction probability of the current word of the target recruitment position description text, $W_t$, $W_c$, $b_t$ and $b_c$ are pre-set parameters.

The first vector sequence $u_j^t$ and the second vector sequence $u_{j,k}^c$ may be calculated by:

$$u_j^t = \sum_{l=1}^{N} \alpha_{l,j}^t h_l^d$$

$$u_{j,k}^c = \sum_{l=1}^{M_j^c} \alpha_{l,j,k}^c h_l^d$$

where, N refers to the number of sentences of the target recruitment position description text, $M_j^c$ refers to the number of words in the $j^{th}$ sentence, $h_l^d$ refers to the semantic characterization vector of the word in the lth sentence, and $\alpha_{l,j}^t$ and $\alpha_{l,j,k}^c$ are intermediate variables in the calculation of the attention mechanism, calculated by the following formula:

$$\alpha_{l,j}^t = \frac{\exp(g_{l,j}^t)}{\sum_{p=1}^{N} \exp(g_{p,j}^t)}$$

$$\alpha_{l,j,k}^c = \frac{\exp(g_{l,j,k}^c)}{\sum_{p=1}^{M_j^c} \exp(g_{p,j,k}^c)}$$

where, $g_{l,j}^t$, $g_{p,j}^t$, $g_{l,j,k}^c$ and $g_{p,j,k}^c$ are vectors of network intermediate layer.

The formula for calculating $g_{l,j}^t$ and $g_{l,j,k}^c$ are as follows:

$$g_{l,j}^t = v_{\alpha^t}^T \tanh\left(W_{\alpha^t}\left[h_l^d, h_j^t; \theta^s\right] + b_{\alpha^t}\right)$$

$$g_{l,j,k}^c = v_{\alpha^c}^T \tanh\left(W_{\alpha^c}\left[h_l^d; h_{j,k}^c; \theta^s\right] + b_{\alpha^c}\right)$$

where, $W_{\alpha^t}$, $W_{\alpha^c}$, $v_{\alpha^t}^T$, $v_{\alpha^c}^T$, $b_{\alpha^t}$ and $b_{\alpha^c}$ are pre-set parameters.

The calculation of $g_{p,j}{}^t$ and $g_{p,j,k}{}^c$ are similar to the calculation methods of $g_{l,j}{}^t$ and $g_{p,j,k}{}^c$ described above respectively, the formula of $g_{l,j}{}^t$ in which l is replaced by p is the calculation formula of $g_{p,j}{}^t$, and the formula of $g_{l,j,k}{}^c$ in which l is replaced by p is the calculation formula of $g_{p,j,k}{}^c$. p and l are arguments of the accumulation function, whose values are selected in [1, N].

For subject label $t_j$, the following equation is used:

$$t_{j-1} = \arg\max_l \left\{ (\theta^s)l \left( \prod_{k=1}^{M_{j-1}^s} \beta_{*,s_{j-1,k}}^s \right) l \right\}_{l=1}^{K^s}$$

where $t_{j-1}$ represents the subject label of the previous sentence, i.e., the (j−1)th sentence, $M_{j-1}^s$ represents the number of words in the (j−1)th sentence in the target recruitment position description text, $k^s$ represents the number of subjects, and $\beta_{*,s_{j-1,k}}^s$ is a vector expression of the previous sentence by the first skill subject word distribution parameter.

By dividing the attention module 402 and the decoder module 403, the determination of the current words in the skill subject label and the description text is completed, the calculation accuracy is improved, the automatic generation of the target recruitment position description text is realized, the labor cost is reduced, and the recruitment efficiency is improved.

In the present embodiment, optionally, the subject predicting sub-module includes a second cyclic neural network sub-module for obtaining a first sequence of feature vectors based on a hidden layer feature state vector of the cyclic neural network predicting the previous sentence in the text generating sub-module, an embedded characterization vector corresponding to a skill subject label of the previous sentence, and a target skill subject distribution vector; a subject generating sub-module for predicting a skill subject label of a current sentence based on the first sequence feature vector and the first vector sequence.

Specifically, the subject predicting sub-module 4031 may include the second cyclic neural network sub-module 40311 and the subject generating sub-module 40312. The second cyclic neural network sub-module 40311 obtains the hidden layer feature state vector of the cyclic neural network predicting the previous sentence in the text generating sub-module 4032, obtains the embedded characterization vector corresponding to the skill subject label of the previous sentence, and obtains the target skill subject distribution vector $\theta^s$, and obtains the first sequence feature vector by calculation. The hidden layer feature state vector of the cyclic neural network of the previous sentence may be represented by $h_{j-1,M_{j-1}}^c$, the skill subject label of the previous sentence may be represented by $t_{j-1}$, the embedded characterization vector corresponding to the skill subject label of the previous sentence may be represented by $e_{j-1}^t$, and the first sequence feature vector may be represented by $h_j^t$. For example, LSTM (Long Short-Term Memory) may be used for calculation, and the formula is as follows:

$$h_j^t = LSTM\left(\left[e_{j-1}^t; \theta^s; h_{j-1,M_{j-1}^c}^c\right], h_{j-1}^t\right)$$

$$e_j^t = W_{e^t} t_j$$

where $h_{j-1}^t$ represents the first sequence feature vector of the previous sentence, $e_j^t$ represents the embedded characterization vector corresponding to the skill subject label of the current sentence, $t_j$ represents the skill subject label of the current sentence, and $W_{e^t}$ represents the pre-set parameter.

The subject generating sub-module 40312 acquires the first sequence feature vector $h_j^t$ of the second cyclic neural network sub-module 40311, and predicts the skill subject label $t_j$ of the current sentence based on the first vector sequence $u_j^t$ of the first attention sub-module 4021. By calculating the first sequence feature vector $h_j^t$, the prediction accuracy of the skill subject label of the current sentence is improved, and generation of the target recruitment position description text is facilitated.

In the present embodiment, optionally, the text generating sub-module includes: a third cyclic neural network sub-module for obtaining a second sequence feature vector based on the first sequence feature vector and the predicted word embedding characterization vector of the previous word; an intermediate processing sub-module for obtaining a pre-generated word probability vector according to the second vector sequence and the second sequence feature vector; and a copy mechanism sub-module configured to process the pre-generated word probability vector based on the first skill subject word distribution parameter to obtain the current word in the predicted target recruitment position description text.

Specifically, the text generating sub-module 4032 may include a third cyclic neural network sub-module 40321, an intermediate processing sub-module 40322, and a copy mechanism sub-module 40323. The third cyclic neural network submodule 40321 obtains the first sequence feature vector $h_j^t$ and the predicted word embedding characterization vector of the previous word, to obtain the second sequence feature vector. The predicted word embedding characterization vector of the previous word may be represented by $e_{j,k-1}^c$, and the second sequence feature vector may be represented by $h_{j,k}^c$. For example, LSTM may be used for calculation, and the formula is as follows:

$$h_{j,k}^c = LSTM\left(\left[e_{j,k-1}^c; \theta^s; h_j^t\right], h_{j,k-1}^c\right)$$

$$e_{j,k}^c = W_{e^c} y_{j,k}$$

Where $h_{j,k-1}^c$ represents a second sequence feature vector of a previous word, $e_{j,k}^c$ represents a word embedding characterization vector of a current word, $y_{j,k}$ represents a pre-generated word probability vector, $W_{e^c}$ represents a preset parameter.

The intermediate processing sub-module 40322 obtains a pre-generated word probability vector based on the second vector sequence $u_{j,k}^c$ and the second sequence feature vector $h_{j,k}^c$, and the pre-generated word probability vector may be represented by $y_{j,k}$. The copy mechanism sub-module 40323 processes the pre-generated word probability vector based on the first skill subject word distribution parameter to obtain the current word $s_{j,k}$ in the predicted target recruitment position description text. The first skill subject word distribution parameter may be pre-defined, represented by $\beta^s$. By dividing the text generating sub-module 4032 into three sub-modules, the description text of the target recruitment position is automatically generated, the matching accuracy between the description text and the target position is improved, and the generation efficiency of the description text is improved.

One embodiment of the above-mentioned application has the advantage that the automatic generation of the target recruitment position description text is realized by dividing the description text generation sub-module into an encoder module, an attention module and a decoder module. The problem of art manually extraction of position information by human resource employees in the prior is solved, the subjectivity of people is reduced, the time and cost for generating a recruitment position description text is saved, errors caused by the fact that human resource employees have field gaps for professional skills of different positions are avoided, accurate matching of recruitment positions with personnel to be recruited is facilitated, and recruitment efficiency is improved.

Figure 5:
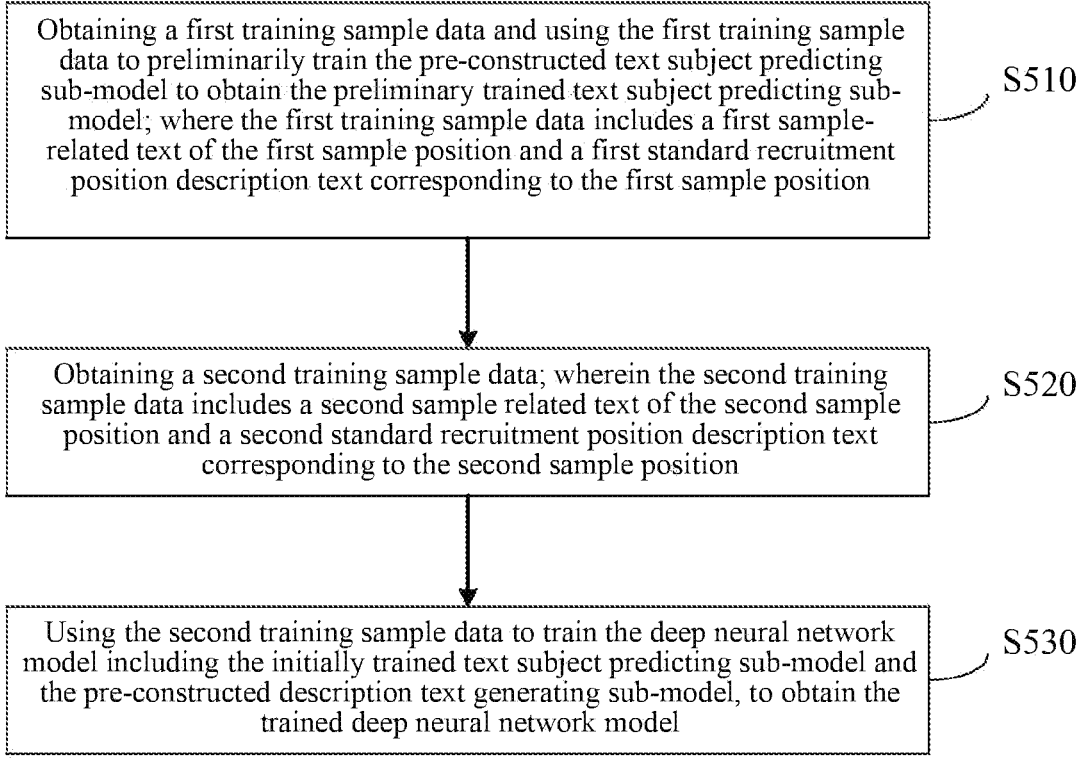
FIG. 5 is an illustrative flow diagram of a training method of a deep neural network model according to an embodiment of the present disclosure.

FIG. 5 is an illustrative flow chart of a method of training the deep neural network model according to an embodiment of the present disclosure, which is further optimized on the basis of the above-described embodiment to train the deep neural network to generate recruitment position description text. The method may be performed by a training apparatus of the deep neural network model, which may be implemented in software and/or hardware, and may be integrated in an electronic device having a computing capability. As shown in FIG. 5, the training method of the deep neural network model provided in the present embodiment may include following steps.

S510 includes obtaining a first training sample data, and using the first training sample data to preliminarily train the pre-constructed text subject predicting sub-model to obtain the preliminary trained text subject predicting sub-model; where the first training sample data includes a first sample-related text of the first sample position and a first standard recruitment position description text corresponding to the first sample position;

At least two types of training sample data are collected and may be divided into a first training sample data and a second training sample data. The first training sample data may include a first sample-related text of the first sample position and a first standard recruitment position description text corresponding to the first sample position. The first sample-related text may include at least one of a resume text of a person that has been determined to meet a position requirement of the first sample position, a text including position responsibility data, and a text including project data related to position, and the first standard recruitment position description text is a standard recruitment position description text corresponding to the first sample position that has been edited.

Figure 6:
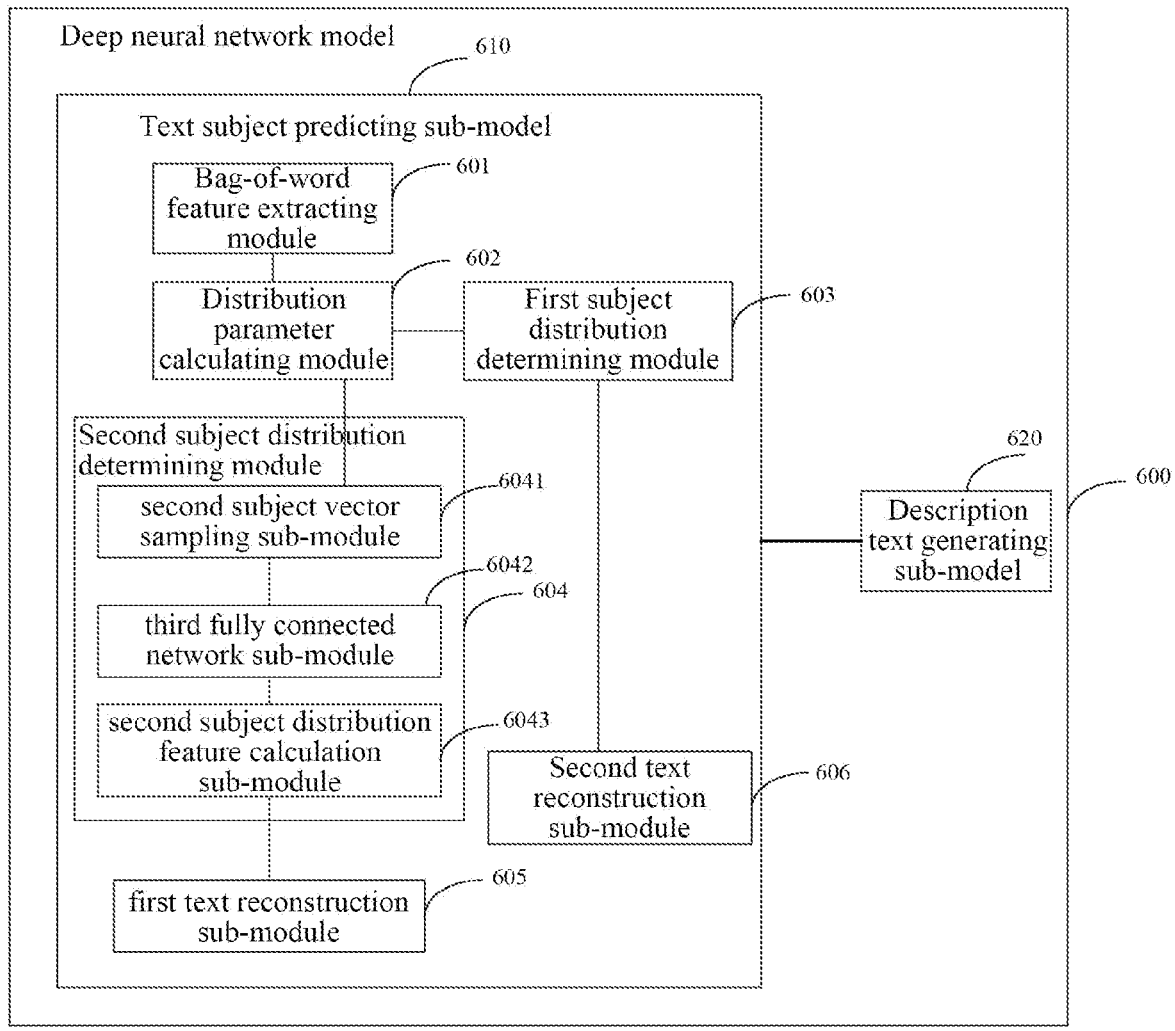
FIG. 6 is an illustrative structural diagram of a deep neural network model according to an embodiment of the present disclosure.

FIG. 6 is an illustrative structural diagram of a deep neural network model in which a text subject prediction sub-model 610 and a description text generation sub-model 620 are pre-constructed. The text subject predicting sub-model 610 is initially trained by the first training sample data, and the training result is corrected according to the first standard recruitment position description text to obtain the initially trained text subject predicting sub-model 610.

In the present embodiment, optionally, on the basis of the foregoing embodiment, the text subject predicting sub-model further includes: a second subject distribution determining module for obtaining an original skill subject distribution vector according to a skill subject vector distribution parameter; a first text reconstruction sub-module for generating predicted bag-of-word characterization data of the reconstructed original text related to the target position according to the second skill subject word distribution parameter and the original skill subject distribution vector; and a second text reconstruction sub-module for generating the reconstructed predictive bag-of-word characterization data of the standard recruitment position description text according to the first skill subject word distribution parameter and the target skill subject distribution vector.

Specifically, the text subject prediction sub-model 610 may include a bag-of-word feature extracting module 601, a distribution parameter calculating module 602, a first subject distribution determining module 603, a second subject distribution determining module 604, a first text reconstruction sub-module 605, and a second text reconstruction sub-module 606. The second subject distribution determining module 604 receives a skill subject vector distribution parameter $\mu_d$ and $\sigma_d$ of the distribution parameter calculating module 602, and calculates an original skill subject distribution vector, which may be represented by $\theta^d$.

The second subject distribution determining module 604 may include a second subject vector sampling sub-module 6041, a third fully connected network sub-module 6042, and a second subject distribution feature calculation sub-module 6043. The second subject vector sampling sub-module 6041 is configured to obtain the second skill subject vector for the first skill subject vector distribution sub-parameter and the second skill subject vector distribution sub-parameter. The second skill subject vector may be calculated based on $\mu_d$ and $\sigma_d$, and the second skill subject vector may be represented by $z^d$. The third fully connected network sub-module 6042 is configured to perform feature extraction for the second skill subject vector to obtain the second subject feature vector. For example, the subject vector $z^d \sim N(\mu_d, \sigma_d^2)$ may be obtained by sampling. The third fully connected network sub-module 6042 may include one or more layers of fully connected networks. The fully connected network in the third fully connected network sub-module 6042 may be represented by $f_{\theta^d}$.

The second subject distribution feature calculating sub-module 6043 receives the second subject feature vector of the third fully connected network sub-module 6042, and obtains the original skill subject distribution vector according to the pre-set second activation function. The second activation function may be represented by softmax($f_{\theta^d}$), and the original skill subject distribution vector may be represented by $\theta^d$, where $\theta^d = \text{softmax}(f_{\theta^d}(z^d))$.

The first text reconstruction sub-module 605 obtains the original skill subject distribution vector $\theta^d$, and obtains the reconstructed predicted bag-of-word characterization data of the original text related to the target position according to the pre-defined second skill subject word distribution parameter. The second skill subject word distribution parameter may be represented by $\beta^d$, and the prediction probability of the bag-of-word characterization data of the first text reconstruction sub-module 605 is calculated by:

$$p(x,l) = \theta^d \cdot \beta^d$$

where $p(x,l)$ represents prediction probability of the bag-of-word characterization data of the original text related to the target position.

The second text reconstruction sub-module 606 obtains the predicted bag-of-word characterization data of the reconstructed standard recruitment position description text according to the first skill subject word distribution parameter and the target skill subject distribution vector $\theta^s$, and the first skill subject word distribution parameter may be represented by $\beta^s$. The bag-of-word characterization data prediction probability of the second text reconstruction sub-module 606 is calculated by:

$$p(s_j | \theta^s, \beta^s) = \theta^s \cdot \prod_{k=1}^{M_j^s} \beta_{*,s_{j,k}}^s$$

where, $p(s_j|\theta^s, \beta_s)$ represents the prediction probability of the bag-of-word characterization data of the standard recruitment position description text, $M_j^s$ represents the number of words in the $j^{th}$ sentence after the bag-of-word feature selection, and $\beta_{*,s_j}^s$ represents vector expression of the current sentence by the first skill subject word distribution parameter $\beta^s$.

By dividing the text subject predicting sub-model 610 into a second subject distribution determining module 604, a first text reconstruction sub-module 605, and a second text reconstruction sub-module 606, accurate training of the text subject predicting sub-model 610 is realized, and the accuracy of the text subject prediction is improved, thereby improving the generation efficiency of the target recruitment position recruitment text.

In the present embodiment, optionally, using the first training sample data to preliminarily training the pre-constructed text subject predicting sub-model to obtain a preliminary trained text subject predicting sub-model, which may include: inputting the first sample-related text into the pre-constructed text subject predicting sub-model; calculating a first loss function value based on a first disparity information and a second disparity information by using a neural variation method; and adjusting the network parameters in the pre-constructed text subject predicting sub-model according to the calculated first loss function value until reaching the threshold of the number of iterations or the convergence of the value of the loss function, where the first disparity information is a disparity information between a first predictive bag-of-word characterization data output by the first text reconstruction sub-module and the bag-of-word characterization data of the text related to the first sample output by the bag-of-word feature extracting module, and the second disparity information is disparity information between the second predictive bag-of-word characterization data output by the second text reconstruction sub-module and the bag-of-word characterization data of the first standard recruitment position description text.

Specifically, the first sample-related text is input to the pre-constructed text subject predicting sub-model 610, the bag-of-word feature extracting module 601 outputs the bag-of-word characterization data $X_i^{bow}$ of the first sample-related text, the first text reconstruction sub-module 605 outputs the first predicting bag-of-word characterization data $X'^{bow}_i$, and the disparity information between $X_i^{bow}$ and $X'^{bow}_i$ is the first disparity information. The second prediction bag-of-word characterization data is output by the second text reconstruction sub-module 606, and the disparity information between the second prediction bag-of-word characterization data and the bag-of-word characterization data of the first standard recruitment position description text is used as the second disparity information. After obtaining the first disparity information and the second disparity information, the first loss function value is calculated by the neural variational method, and the network parameters in the text subject prediction sub-model 610 are adjusted according to the first loss function value until reaching the threshold value of the number of iteration or the convergence of the value of the loss function, so that the bag-of-word characterization data output by the text subject predicting sub-model 610 meets the requirement of the bag-of-word characterization data of the first standard recruitment position description text.

The calculation formula of the first loss function value is as follows:

$$-\sum_{k=1}^{M^d} \log(\theta^d, \beta_{*,x_k}^d) +$$

$$D_{KL}(q(\theta^d)\|p(\theta^d)) - \sum_{j=1}^{N} \log\left(\theta^s \cdot \prod_{k=1}^{M_j^s} \beta_{*,s_{j,k}}^s\right) + D_{KL}(q(\theta^s)\|p(\theta^s))$$

where, DKL represents a Kullback-Leiblerdivergence distance (relative entropy distance), $\beta_{*,x_k}^d$ represents a vector expression of the current sentence, i.e., the $k^{th}$ word by the second skill subject word distribution parameter $\beta^d$, $\beta_{*,s_{j,k}}^s$ represents a vector expression of the $j^{th}$ sentence by the first skill subject word distribution parameter, $p(\theta^d)$ and $p(\theta^s)$ represent actual probability distribution of the data, and $q(\theta^d)$ and $q(\theta^s)$ represent an estimated probability distribution function of a neural variation approximation.

By calculating the disparity information and the first loss function value, the preliminary training of the text subject predicting sub-model 610 is completed, and the accuracy of the text subject prediction is achieved.

S520 includes obtaining a second training sample data; where the second training sample data includes a second sample related text of the second sample position and a second standard recruitment position description text corresponding to the second sample position.

After obtaining the preliminarily trained text subject predicting sub-model 610, the acquired second training sample data is obtained. The second sample-related text includes at least one of a resume text of a person that has been determined to meet a post requirement of the second sample post, a text containing position responsibility data, and a text containing project data related to position. The second standard recruitment position description text is a standard recruitment post description text corresponding to the edited second sample post.

S530 includes using the second training sample data to train the deep neural network model including the initially trained text subject predicting sub-module and the pre-constructed description text generating sub-module, to obtain the trained deep neural network model.

The preliminarily trained text subject predicting sub-model 610 and the pre-constructed description text generating sub-model 620 are trained by the second training sample data, and the output result of the deep neural network model is corrected according to the second standard recruitment position description text to obtain the trained deep neural network model.

Optionally, in the present embodiment, using the second training sample data to train the deep neural network model includes:

making the second sample related text input include the deep neural network model of the preliminary trained text subject predicting sub-model and the pre-constructed description text generating sub-model;

calculating a second loss function value based on the third disparity information and the fourth disparity information; where the third disparity information is the disparity between the first predictive bag-of-word characterization data output by the first text reconstruction sub-module and the bag-of-word characterization data of the second sample related text output by the bag-of-word feature extracting module, and the fourth disparity information is the disparity information between the second predictive bag-of-word characterization data output by the second text reconstruction sub-module and the bag-of-word characterization data of the second standard recruitment position description text;

calculating a third loss function value based on the fifth disparity information; where the fifth disparity information is the disparity information between the second standard recruitment position description text and the text output by the description text generating sub-model; determining an overall loss function value according to the calculated second loss function value and the third loss function value, and adjusting network parameters in the text subject predicting sub-model and the description text generating sub-model according to the overall loss function value until reaching the threshold of the number of iteration or the convergence of the overall loss function value.

Specifically, after obtaining the preliminary trained text subject predicting sub-model 610, the second sample related text is input to the text subject predicting sub-model 610 and the description text generating sub-model 620. The first prediction bag-of-word characterization data is output by the first text reconstruction sub-module 605 in the text subject predicting sub-model 610, the bag-of-word characterization data of the second sample related text is output by the bag-of-word feature extracting module 601 in the text subject predicting sub-model 610, and the disparity information between the first prediction bag-of-word characterization data and the bag-of-word characterization data of the second sample related text is used as the third disparity information. The second predictive bag-of-word characterization data is output by the second text reconstruction sub-module 606, and the disparity information between the second predictive bag-of-word characterization data and the bag-of-word characterization data of the second standard recruitment position description text is used as the fourth disparity information. After obtaining the third disparity information and the fourth disparity information, the second loss function value may be calculated by using a neural variation method.

The description text is output by the description text generating sub-model 620, the disparity information between the second standard recruitment position description text and the output description text is used as the fifth disparity information, and the third loss function value is calculated based on the fifth disparity information. Determining an overall loss function value based on the calculated second loss function value, the third loss function value, and a corresponding weight. The network parameters in the text subject predicting sub-model and the description text generating sub-model are adjusted according to the total loss function value until reaching the threshold value of the number of iterations or the total loss function value convergence, so that the deep neural network model 600 can output recruitment position description text meeting the requirements. The calculation of the total loss function for the text subject predicting sub-model 610 and the description text generating sub-model 620 improves the accuracy of the generation of description text of the deep neural network model 600, avoids inaccuracy of the description text due to subjectivity and field differences, and improves the description text generation efficiency.

Figure 7:
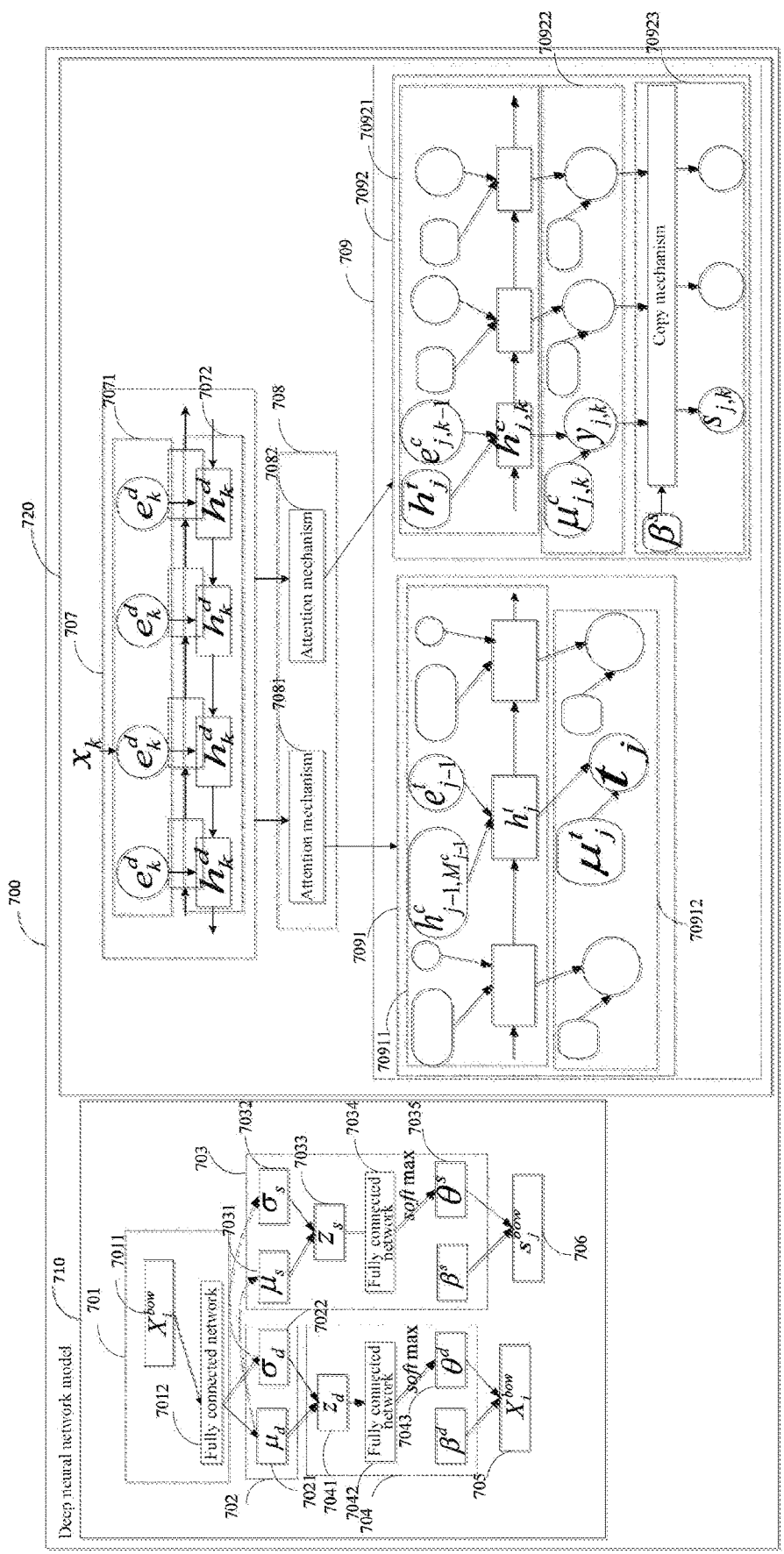
FIG. 7 is an illustrative structural diagram of a deep neural network model according to an embodiment of the present disclosure.

FIG. 7 is an illustrative schematic diagram of a deep neural network model 700 including a text subject predicting sub-model 710 and a description text generating sub-model 720, according to an embodiment of the present disclosure.

The text subject predicting sub-model 710 includes a bag-of-word feature extracting module 701, a distribution parameter calculating module 702 and a first subject distribution determining module 703, a second subject distribution determining module 704, a first text reconstruction sub-module 705, and a second text reconstruction sub-module 706. The bag-of-word feature extracting module 701 includes a bag-of-word generating sub-module 7011 and a first fully connected network sub-module 7012. The distribution parameter calculating module 702 includes a first parameter calculating sub-module 7021 and a second parameter calculating sub-module 7022. The first subject distribution determining module 703 includes a third parameter calculating sub-module 7031, a fourth parameter calculating sub-module 7032, a first subject vector sampling sub-module 7033, a second fully connected network sub-module 7034 and a first subject distribution feature calculating sub-module 7035. The second subject distribution determining module 704 includes a second subject vector sampling sub-module 7041, a third fully connected network sub-module 7042 and a second subject distribution feature calculating sub-module 7043. The predicted bag-of-word characterization data of the reconstructed standard recruitment position description text is represented as $s_j^{bow}$.

The description text generating sub-model 720 includes an encoder module 707, an attention module 708, and a decoder module 709. The encoder module 707 includes a word vector generating sub-module 7071 and a first cyclic neural network sub-module 7072. The attention module 708 includes a first attention sub-module 7081 and a second attention sub-module 7082. The decoder module 709 includes a subject prediction sub-module 7091 and a text generating sub-module 7092. The subject predicting sub-module 7091 includes a second cyclic neural network sub-module 70911 and a subject generating sub-module 70912. The text generating sub-module 7092 includes a third cyclic neural network sub-module 70921, an intermediate processing sub-module 70922, and a copy mechanism sub-module 70923. The $k^{th}$ word in the original text related to the target position or the sample related text is represented as $x_k$.

One embodiment of the above-mentioned application has the advantage of achieving preliminary training of the text subject prediction sub-model by obtaining the first training sample data; By obtaining the second training sample data, a deep neural network model is further trained, so that the description text output by the deep neural network model meets the requirements of the standard text, the accuracy of the description text is improved, and the output efficiency of the target position description text is further improved.

Figure 8:
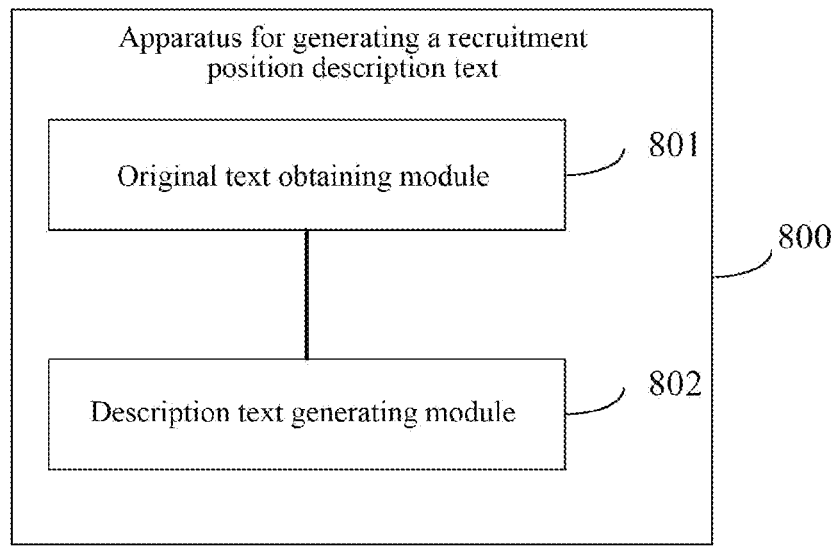
FIG. 8 is an illustrative structural diagram of an apparatus for generating a recruitment position description text according to an embodiment of the present disclosure.

FIG. 8 is a schematic structural diagram of an apparatus for generating a recruitment position description text according to an embodiment of the present disclosure. The method for generating a recruitment position description text according to the embodiment of the present disclosure ma be executed, and the apparatus has a function module and a beneficial effect corresponding to the execution method. As shown in FIG. 8, the apparatus 800 may include: an original text obtaining module 801, configured to obtain an original text related to a target position; and a description text generating module 802 configured to generate the target recruitment position description text corresponding to the target position based on the original text related to the target position and the pre-trained deep neural network model.

Optionally, the original text related to the target position includes at least one of a resume text of a person determined to meet a position requirement, a text containing position responsibility data, and a text containing project data related to position.

Alternatively, the deep neural network model includes: a text subject predicting sub-model for predicting a target skill subject distribution vector based on the original text related to the target position; and a description text generating sub-model for generating a target recruitment position description text of the target position according to the target skill subject distribution vector.

Alternatively, the text subject predicting sub-model includes: a bag-of-word feature extracting module for extracting a bag-of-word feature vector of the original text related to the target position; a distribution parameter calculating module for calculating a skill subject vector distribution parameter according to the bag-of-word feature vector and a non-linear network layer; a first subject distribution determining module for obtaining a target skill subject distribution vector according to the skill subject vector distribution parameter and a pre-set subject distribution hypothesis parameter.

Optionally, the bag-of-word feature extracting module includes: a bag-of-word generating sub-module for generating bag-of-word characterization data of the original text related to the target position; and a first fully connected network sub-module for performing feature extraction for the bag-of-word characterization data to obtain a bag-of-word feature vector.

Optionally, the distribution parameter calculating module includes: a first parameter calculating sub-module for calculating a first skill subject vector distribution sub-parameter according to the bag-of-word feature vector and the first non-linear network layer; and a second parameter calculating sub-module for calculating a second skill subject vector distribution sub-parameter based on the bag-of-word feature vector and the second non-linear network layer.

Optionally, the first subject distribution determining module includes: a third parameter calculating sub-module for calculating a third skill subject vector distribution parameter according to the first skill subject vector distribution sub-parameter and the first pre-set subject distribution hypothesis sub-parameter; a fourth parameter calculating sub-module for calculating a fourth skill subject vector distribution parameter according to the second skill subject vector distribution sub-parameter and the second pre-set subject distribution hypothesis sub-parameter; a first subject vector sampling sub-module for obtaining a first skill subject vector according to a third skill subject vector distribution parameter and a fourth skill subject vector distribution parameter; a second fully connected network sub-module for performing feature extraction for the first skill subject vector to obtain the first subject feature vector; and a first subject distribution feature calculating sub-module for obtaining a target skill subject distribution vector based on the first subject feature vector and the first activation function.

Optionally, the description text generating sub-model includes: an encoder module for generating a sequence of semantic characterization vectors of the current sentence in the original text related to the target position; an attention module for performing weighted transformation for the sequence of the semantic characterization vectors according to the target skill subject distribution vectors; a decoder module for predicting a skill subject label of a current sentence according to the weighted and transformed semantic characterization vector sequence, and predicting the current word of the target recruitment position description text according to the skill subject label.

Optionally, the encoder module includes: a word vector generating sub-module for generating a word vector of each word included in the current sentence in the original text related to the target position; and a first cyclic neural network sub-module for generating a sequence of semantic characterization vectors of the current sentence according to each word vector.

Optionally, the attention module includes a first attention sub-module and a second attention sub-module; The decoder module includes a subject predicting sub-module and a text generating sub-module. The first attention sub-module is configured for performing weighted transformation on the semantic characterization vector sequence according to the target skill subject distribution vector and the hidden layer feature state vector in the subject predicting sub-module to obtain a weighted and transformed first vector sequence. The second attention submodule is configured for performing weighted transformation on the semantic characterization vector sequence according to the target skill subject distribution vector and the hidden layer feature state vector in the text generating sub-module to obtain a weighted and transformed second vector sequence.

The subject predicting sub-module is configured for predicting a skill subject label of a current sentence based on a target skill subject distribution vector and a first vector sequence. The text generating sub-module is configured for predicting the current word in the target recruitment position description text based on the skill subject label of the current sentence and the second vector sequence.

Optionally, the subject predicting sub-module includes: a second cyclic neural network sub-module and a subject generating sub-module. The second cyclic neural network sub-module is configured for obtaining a first sequence feature vector, based on a hidden layer feature state vector of a cyclic neural network predicting a previous sentence in the text generating sub-module, an embedded characterization vector corresponding to a skill subject label of the previous sentence, and a target skill subject distribution vector. The subject generating sub-module is configured for predicting a skill subject label of a current sentence based on the first sequence feature vector and the first vector sequence.

Optionally, the text generation sub-module includes: a third circulating neural network sub-module for obtaining a second sequence feature vector based on the first sequence feature vector and the predicted word embedding characterization vector of the previous word; an intermediate processing sub-module for obtaining a pre-generated word probability vector according to the second vector sequence and the second sequence feature vector; and a copy mechanism sub-module for processing the pre-generated word probability vector based on the first skill subject word distribution parameter, to obtain the current word in the predicted target recruitment position description text.

Optionally, the training process of the deep neural network model includes:
  acquiring first training sample data; and using the first training sample data to preliminarily train the pre-constructed text subject prediction sub-model to obtain a preliminary trained text subject prediction sub-model; where the first training sample data includes a first sample-related text of the first sample position and a first standard recruitment position description text corresponding to the first sample position;
  acquiring second training sample data; where the second training sample data includes a second sample related text of the second sample position and a second standard recruitment position description text corresponding to the second sample position; and using the second training sample data to train a deep neural network model including a preliminary trained text subject prediction sub-model and a pre-constructed description text generation sub-model to obtain a trained deep neural network model.

Optionally, the text subject prediction sub-model further includes: a second subject distribution determining module for obtaining an original skill subject distribution vector based on the skill subject vector distribution parameter; a first text reconstruction sub-module for generating predicted bag-of-word characterization data of the reconstructed original text related to the target position, based on the second skill subject word distribution parameter and the original skill subject distribution vector; and a second text reconstruction sub-module for generating the predictive bag-of-word characterization data of the reconstructed standard recruitment position description text, based on the first skill subject word distribution parameter and the target skill subject distribution vector.

Optionally, the process of preliminary training is performed on the pre-constructed text subject prediction sub-model by using the first training sample data, to obtain a preliminary trained text subject prediction sub-model, including:

inputting a first sample-related text into a pre-constructed text subject prediction sub-model;

calculating a first loss function value by using a neural variation method, based on the first disparity information and the second disparity information; where the first disparity information is disparity information between first predictive bag-of-word characterization data output by the first text reconstruction sub-module and the bag-of-word characterization data of the text related to the first sample output by the bag-of-word feature extraction module, and the second disparity information is disparity information between the second predictive bag-of-word characterization data output by the second text reconstruction sub-module and the bag-of-word characterization data of the first standard recruitment position description text; and adjusting the network parameters in the pre-constructed text subject prediction sub-model based on the calculated first loss function value until reaching the threshold number of iterations or the convergence of the value of the loss function.

Optionally, using the second training sample data to train the deep neural network model including the initially trained text subject predicting sub-model and the pre-constructed description text generating sub-model, to obtain the trained deep neural network model includes:

inputting a second sample-related text input including a pre-trained text subject predicting sub-model and a pre-constructed deep neural network model describing the text generating sub-model;

calculating a second loss function value based on the third disparity information and the fourth disparity information; where the third disparity information is the disparity between the first predictive bag-of-word characterization data output by the first text reconstruction sub-module and the bag-of-word characterization data of the second sample related text output by the bag-of-word feature extracting module, and the fourth disparity information is the disparity information between the second predictive bag-of-word characterization data output by the second text reconstruction sub-module and the bag-of-word characterization data of the second standard recruitment position description text;

calculating a third loss function value based on the fifth disparity information; where the fifth disparity information is the disparity information between the second standard recruitment position description text and the text output by the description text generating sub-model;

determining an overall loss function value based on the calculated second loss function value and the third loss function value, and adjusting network parameters in the text subject prediction sub-model and the description text generating sub-model based on the overall loss function value, until reaching the threshold of the number of iterations or the convergence of an overall loss function value.

One embodiment of the above application has the advantage or good effects of automatically extracting the data in the original text related to the target position through the deep neural network model, to obtain the target recruitment position description text corresponding to the target position. The method solves the problems that in the prior art, position information is manually extracted by a human resource employee, the recruitment position description text is manually written, thus human subjectivity is reduced, generation time and cost of recruitment position description text are saved, errors caused by the fact that human resource employees have field gaps for professional skills of different positions are avoided, accurate matching between recruitment positions and personnel to be recruited is realized, and generation efficiency and recruitment efficiency of recruitment position description text are improved.

According to an embodiment of the present disclosure, the present disclosure also provides an electronic device and a readable storage medium.

Figure 9:
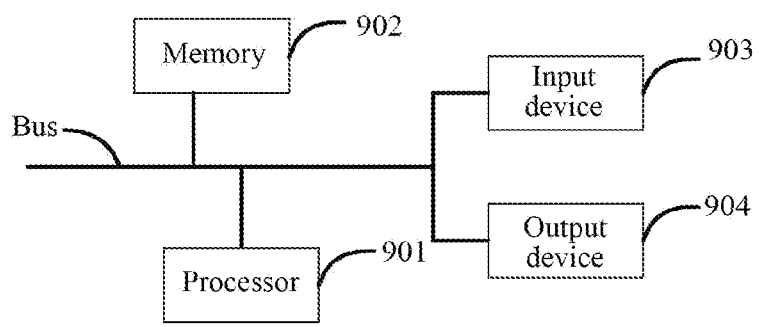
FIG. 9 is a block diagram of an electronic device used to implement a method of generating a recruitment position description text according to an embodiment of the present disclosure.

As shown in FIG. 9, FIG. 9 is a block diagram of an electronic device of a method for generating a recruitment position description text according to an embodiment of the present disclosure. Electronic devices are intended to represent various forms of digital computers, such as laptop computers, desktop computers, worktables, personal digital assistants, servers, blade servers, mainframe computers, and other suitable computers. Electronic devices may also represent various forms of mobile devices, such as personal digital processing, cellular telephones, smart phones, wearable devices, and other similar computing devices. The components shown herein, their connections and relationships, and their functions are by way of example only and are not intended to limit the implementation of the present disclosure as described and/or claimed herein.

As shown in FIG. 9, the electronic device includes one or more processor 901, a memory 902, and an interface for connecting components, including a high speed interface and a low speed interface. The various components are interconnected by different buses and may be mounted on a common motherboard or otherwise as desired. The processor may process instructions executed within the electronic device, including instructions stored in or on a memory to display graphical information of the GUI on an external input/output device, such as a display device coupled to an interface. In other embodiments, multiple processors and/or multiple buses may be used with multiple memories and multiple memories, if desired. Similarly, a plurality of electronic devices may be connected, each providing a portion of the necessary operations (e.g., as a server array, a set of blade servers, or a multiprocessor system). A processor 901 is exemplified in FIG. 9.

The memory 902 is a non-transitory computer readable storage medium provided in this application. The memory stores instructions executable by at least one processor to cause the at least one processor to perform the generation method of the recruitment post description text provided in the present disclosure. The non-transitory computer-readable storage medium of the present disclosure stores computer instructions for causing a computer to execute the generation method of the recruitment position description text provided in the present disclosure.

The memory 902, as a non-transitory computer readable storage medium, can be used to store non-transitory software programs, non-transitory computer executable programs, and modules, such as program instructions/modules corresponding to the generation method of the recruitment position description text in the embodiment of the present disclosure. The processor 901 executes various functional applications and data processing of the server by running non-transitory software programs, instructions, and modules stored in the memory 902, that is, implements the generation method of the recruitment post description text in the above-described method embodiment.

The memory 902 may include a storage program area and a storage data area, where the storage program area may store an operating system, an application program required by at least one function; the storage data area may store data or the like created according to the use of the electronic device of the generation method of the recruitment post description text. In addition, memory 902 may include high speed random access memory, and may also include non-transitory memory, such as at least one magnetic disk storage device, flash memory device, or other non-transitory solid state storage device. In some embodiments, memory 902 may optionally include remotely disposed memory relative to processor 901, which may be connected via a network to an electronic device of a method of generating recruitment position description text. Examples of such networks include, but are not limited to, the Internet, enterprise intranets, local area networks, mobile communication networks, and combinations thereof.

The electronic device for generating the recruitment position description text may further include an input device 903 and an output device 904. The processor 901, the memory 902, the input device 903, and the output device 904 may be connected via a bus or other manners, a bus connection is illustrated in FIG. 9.

The input device 903 may receive input digit or character information, and generate key signal input related to user settings and functional control of an electronic device of the recruitment position description text generation method, such as a touch screen, a keypad, a mouse, a track pad, a touch pad, a pointer bar, one or more mouse buttons, a track ball, a joystick, or the like. The output device 904 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include being implemented in one or more computer programs that may execute and/or interpret on a programmable system including at least one programmable processor, which may be a dedicated or general purpose programmable processor, may receive data and instructions from a memory system, at least one input device, and at least one output device, and transmit the data and instructions to the memory system, the at least one input device, and the at least one output device.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer-readable medium" refer to any computer program product, device, and/or means (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user; for example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), a block chain network, and the Internet.

The computer system may include a client and a server. The client and server are typically remote from each other and typically interact through a communication network. The relationship between the client and the server is generated by a computer program running on the corresponding computer and having a client-server relationship with each other.

According to the technical solution of the embodiment of the present disclosure, the data in the original text related to the target position is automatically extracted through the deep neural network model to obtain the target recruitment position description text corresponding to the target position. The method solves the problems that in the prior art, position information is manually extracted by a human resource employee, recruitment position description text is manually written, human subjectivity is reduced, generation time and cost of recruitment position description text are saved, errors caused by the fact that human resource employees have field gaps for professional skills of different positions are avoided, accurate matching between recruitment positions and personnel to be recruited is realized, and generation efficiency and recruitment efficiency of recruitment position description text are improved.

It is to be understood that reordering, adding or deleting of the steps may be performed when using the various forms shown above. For example, the steps described in the present disclosure may be performed in parallel or sequentially or in a different order, so long as the desired results of the technical solution disclosed in the present disclosure can be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and improvements that fall within the spirit and principles of this application are intended to be included within the scope of this application.

What is claimed is:

1. A method for generating a recruitment position description text, comprising:
    obtaining an original text related to a target position; and
    generating a target recruitment position description text corresponding to the target position based on the obtained original text and a pre-trained deep neural network model, wherein generating the target recruitment position description text corresponding to the target position based on the obtained original text and the pre-trained deep neural network model comprises extracting skill requirements of a job from the original text using the pre-trained deep neural network model, wherein the deep neural network model comprises:
        a text subject predicting sub-model for predicting a target skill subject distribution vector based on the original text; and
        a description text generating sub-model for generating the target recruitment position description text of the target position based on the predicted target skill subject distribution vector; and
    wherein a training process of the deep neural network model comprises:
        obtaining a first training sample data, wherein the first training sample data comprises a first sample-related text of a first sample position and a first standard recruitment position description text corresponding to the first sample position;
        using the obtained first training sample data to preliminarily train a pre-constructed text subject predicting sub-model to obtain a preliminary trained text subject predicting sub-model;
        obtaining a second training sample data, wherein the second training sample data comprises a second sample related text of a second sample position and a second standard recruitment position description text corresponding to the second sample position; and
        using the obtained second training sample data to train the deep neural network model including the preliminary trained text subject predicting sub-model and a pre-constructed description text generating sub-model, to obtain a trained deep neural network model.

2. The method of claim 1, wherein the original text comprises at least one of:
    a resume text of personnel that has been determined to meet position requirements,
    a text containing position responsibility data, and
    a text containing project data related to position.

3. The method of claim 1, wherein the text subject predicting sub-model comprises:
    a bag-of-word feature extracting module for extracting a bag-of-word feature vector of the original text;
    a distribution parameter calculating module for calculating a skill subject vector distribution parameter based on the extracted bag-of-word feature vector and a non-linear network layer; and
    a first subject distribution determining module for obtaining the target skill subject distribution vector based on the skill subject vector distribution parameter and a pre-set subject distribution hypothesis parameter.

4. The method of claim 3, wherein the bag-of-word feature extracting module comprises:
    a bag-of-word generating sub-module for generating bag-of-word characterization data of the original text; and
    a first fully connected network sub-module for performing feature extraction for the bag-of-word characterization data to obtain the bag-of-word feature vector.

5. The method of claim 3, wherein the distribution parameter calculating module comprises:
    a first parameter calculating sub-module for calculating a first skill subject vector distribution sub-parameter based on the bag-of-word feature vector and a first non-linear network layer; and
    a second parameter calculating sub-module for calculating a second skill subject vector distribution sub-parameter based on the bag-of-word feature vector and a second non-linear network layer.

6. The method of claim 5, wherein the first subject distribution determining module comprises:
    a third parameter calculating sub-module for calculating a third skill subject vector distribution parameter based on the first skill subject vector distribution sub-parameter and a first pre-set subject distribution hypothesis sub-parameter; and
    a fourth parameter calculating sub-module for calculating a fourth skill subject vector distribution parameter based on the second skill subject vector distribution sub-parameter and a second pre-set subject distribution hypothesis sub-parameter;
    a first subject vector sampling sub-module for obtaining a first skill subject vector based on the third skill subject vector distribution parameter and the fourth skill subject vector distribution parameter;
    a second fully connected network submodule for extracting a first subject feature vector from the first skill subject vector; and
    a first subject distribution feature calculating sub-module for obtaining the target skill subject distribution vector based on the extracted first subject feature vector and a first activation function.

7. The method of claim 3, wherein the text subject predicting sub-model further comprises:
    a second subject distribution determining module for obtaining an original skill subject distribution vector based on the skill subject distribution parameter;
    a first text reconstruction sub-module for generating predicted bag-of-word characterization data of a reconstructed original text related to the target position based on a second skill subject word distribution parameter and the original skill subject distribution vector; and a second text reconstruction sub-module for generating a predictive bag-of-word characterization data of a reconstructed standard recruitment position description text based on a first skill subject word distribution parameter and the target skill subject distribution vector.

8. The method of claim 7, wherein using the obtained first training sample data to preliminarily train the pre-constructed text subject predicting sub-model comprises:

inputting the first sample-related text into the pre-constructed text subject predicting sub-model;

calculating a first loss function value based on a first disparity information and a second disparity information by using a neural variation method, wherein the first disparity information is disparity information between first predictive bag-of-word characterization data output by the first text reconstruction sub-module and bag-of-word characterization data of the first sample-related text output by the bag-of-word feature extracting module, and the second disparity information is disparity information between second predictive bag-of-word characterization data output by the second text reconstruction sub-module and bag-of-word characterization data of the first standard recruitment position description text; and adjusting network parameters in the pre-constructed text subject predicting sub-model based on the calculated first loss function value until a threshold number of iterations is reached or a loss function value converges.

9. The method of claim 7, wherein using the second training sample data to train the deep neural network model including the preliminary trained text subject predicting sub-model and the pre-constructed description text generating sub-model to obtain the trained deep neural network model comprises:

inputting a second sample-related text into the deep neural network model including the preliminary trained text subject predicting sub-model and the pre-constructed description text generating sub-model;

calculating a second loss function value based on third disparity information and fourth disparity information, wherein the third disparity information is disparity information between first predictive bag-of-word characterization data output by the first text reconstruction sub-module and bag-of-word characterization data of a second sample related text output by the bag-of-word feature extracting module, and the fourth disparity information is disparity information between second predictive bag-of-word characterization data output by the second text reconstruction sub-module and bag-of-word characterization data of the second standard recruitment position description text;

calculating a third loss function value based on fifth disparity information, wherein the fifth disparity information is disparity information between the second standard recruitment position description text and a text output by the description text generating sub-model;

determining an overall loss function value based on the calculated second loss function value and the third loss function value; and adjusting network parameters in the text subject predicting sub-model and the description text generating sub-model based on the overall loss function value until a threshold number of iterations is reached or the overall loss function value converges.

10. The method of claim 1, wherein the description text generating sub-model comprises:

an encoder module for generating a sequence of semantic characterization vectors of a current sentence in the original text;

an attention module for performing a weighted transformation on the generated sequence based on the target skill subject distribution vector; and a decoder module for predicting a skill subject label of the current sentence based on the weighted and transformed sequence, and predicting a current word of the target recruitment position description text based on the predicted skill subject label.

11. The method of claim 10, wherein the encoder module comprises:

a word vector generating sub-module for generating a word vector of respective word included in the current sentence in the original text; and a first circular neural network sub-module for generating the sequence of semantic characterization vectors of the current sentence based on respective word vector.

12. The method of claim 10, wherein the attention module comprises a first attention sub-module and a second attention sub-module, and the decoder module comprises a subject predicting sub-module and a text generating sub-module, wherein:

the first attention sub-module is configured for performing weighted transformation on a semantic characterization vector sequence, based on the target skill subject distribution vector and a hidden layer feature state vector in the subject predicting sub-module, to obtain a weighted and transformed first vector sequence;

the second attention sub-module is configured for performing weighted transformation on the semantic characterization vector sequence based on the target skill subject distribution vector and a hidden feature state vector in the text generating sub-module, to obtain a weighted and transformed second vector sequence;

the subject predicting sub-module is configured for predicting a skill subject label of the current sentence based on the target skill subject distribution vector and the weighted and transformed first vector sequence; and the text generating sub-module is configured for predicting the current word in the target recruitment position description text based on the skill subject label of the current sentence and the weighted and transformed second vector sequence.

13. The method of claim 12, wherein the subject predicting sub-module comprises:

a second circular neural network sub-module for obtaining a first sequence feature vector, based on a hidden layer feature state vector of a circular neural network predicting a previous sentence in the text generating sub-module, an embedded characterization vector corresponding to a skill subject label of the previous sentence, and the target skill subject distribution vector; and a subject generating sub-module for predicting the skill subject label of the current sentence based on the first sequence feature vector and the first vector sequence.

14. The method of claim 13, wherein the text generating sub-module comprises:

a third circular neural network sub-module for obtaining a second sequence feature vector based on the first sequence feature vector and a predicted word embedding characterization vector of a previous word;

an intermediate processing sub-module for obtaining a pre-generated word probability vector based on the second vector sequence and the second sequence feature vector; and a copy mechanism sub-module for processing the pre-generated word probability vector based on a first skill subject word distribution parameter, to obtain the current word in the predicted target recruitment position description text.

15. An electronic device, comprising:
at least one processor; and
a memory in communication connection with the at least one processor; wherein,
the memory stores instructions executable by the at least one processor, the instructions, when executed by the at least one processor, causing the at least one processor to perform operations comprising:
obtaining an original text related to a target position; and
generating a target recruitment position description text corresponding to the target position based on the obtained original text and a pre-trained deep neural network model, wherein generating the target recruitment position description text corresponding to the target position based on the obtained original text and the pre-trained deep neural network model comprises extracting skill requirements of a job from the original text using the pre-trained deep neural network model,
wherein the deep neural network model comprises:
a text subject predicting sub-model for predicting a target skill subject distribution vector based on the original text; and
a description text generating sub-model for generating the target recruitment position description text of the target position based on the predicted target skill subject distribution vector; and
wherein a training process of the deep neural network model comprises:
obtaining a first training sample data, wherein the first training sample data comprises a first sample-related text of a first sample position and a first standard recruitment position description text corresponding to the first sample position:
using the obtained first training sample data to preliminarily train a pre-constructed text subject predicting sub-model to obtain a preliminary trained text subject predicting sub-model;
obtaining a second training sample data, wherein the second training sample data comprises a second sample related text of a second sample position and a second standard recruitment position description text corresponding to the second sample position; and using the obtained second training sample data to train the deep neural network model including the preliminary trained text subject predicting sub-model and a pre-constructed description text generating sub-model, to obtain a trained deep neural network model.

16. A non-transitory computer-readable storage medium storing computer instructions for causing a computer to perform operations comprising:
obtaining an original text related to a target position; and
generating a target recruitment position description text corresponding to the target position based on the obtained original text and a pre-trained deep neural network model, wherein generating the target recruitment position description text corresponding to the target position based on the obtained original text and the pre-trained deep neural network model comprises extracting skill requirements of a job from the original text using the pre-trained deep neural network model,
wherein the deep neural network model comprises:
a text subject predicting sub-model for predicting a target skill subject distribution vector based on the original text; and
a description text generating sub-model for generating the target recruitment position description text of the target position based on the predicted target skill subject distribution vector, and
wherein a training process of the deep neural network model comprises:
obtaining a first training sample data, wherein the first training sample data comprises a first sample-related text of a first sample position and a first standard recruitment position description text corresponding to the first sample position;
using the obtained first training sample data to preliminarily train a pre-constructed text subject predicting sub-model to obtain a preliminary trained text subject predicting sub-model;
obtaining a second training sample data, wherein the second training sample data comprises a second sample related text of a second sample position and a second standard recruitment position description text corresponding to the second sample position; and
using the obtained second training sample data to train the deep neural network model including the preliminary trained text subject predicting sub-model and a pre-constructed description text generating sub-model, to obtain a trained deep neural network model.

* * * * *